United States Patent [19]
Nishida

[11] Patent Number: 5,831,796
[45] Date of Patent: Nov. 3, 1998

[54] APPARATUS FOR FIXING A HEAD CYLINDER

[75] Inventor: Yoshikazu Nishida, Tokyo, Japan

[73] Assignee: Mitsubishi Denki Kabushiki Kaisha, Tokyo, Japan

[21] Appl. No.: 833,070

[22] Filed: Apr. 3, 1997

[30] Foreign Application Priority Data

Apr. 26, 1996 [JP] Japan .................................. 8-106870

[51] Int. Cl.[6] ...................................................... G11B 5/52

[52] U.S. Cl. ........................ 360/107; 360/84; 360/130.22

[58] Field of Search ........................... 360/107, 84, 97.02, 360/130.22

[56] References Cited

U.S. PATENT DOCUMENTS

| | | | |
|---|---|---|---|
| 4,740,848 | 4/1988 | Schild et al. | 360/107 |
| 4,761,696 | 8/1988 | Muller et al. | 360/84 |
| 5,021,908 | 6/1991 | Morimoto et al. | 360/107 |
| 5,459,625 | 10/1995 | Ohshima et al. | 360/84 |
| 5,561,571 | 10/1996 | Kim | 360/107 |

*Primary Examiner*—John H. Wolff

[57] ABSTRACT

An apparatus for fixing a head cylinder provided with a magnetic head to a deck base. The apparatus has a flange portion provided on a lower portion of the head cylinder; contacting portions provided on the lower portion of the head cylinder; and an elastic plate and screws for fixing the head cylinder to the deck base by applying a force directed to the deck base to the flange portion with the elastic plate and screws contacted with the deck base.

11 Claims, 9 Drawing Sheets

APPARATUS FOR FIXING A HEAD CYLINDER

BACKGROUND OF THE INVENTION

The present invention relates to an apparatus for fixing a head cylinder to a deck base, in a helical-scan type magnetic recording and reproducing apparatus, for example.

In helical-scan type magnetic recording and reproducing apparatuses, the head cylinder is generally tilted and attached to the deck base. FIGS. 11A and 11B are plan and side views schematically showing a head cylinder fixing apparatus for the helical-scan type magnetic recording and reproducing apparatus. As shown in FIGS. 11A and 11B, in the conventional head cylinder fixing apparatus, a bed seat 52 is fixed to a deck base 51 by employing screws 53, 54, and 55. A head cylinder 56 having screw holes 56b and 56c at its bottom surface 56a is placed on the bed seat 52 and fixed from under the deck base 51 (or from above the turned-over apparatus) by employing screws 57 and 58.

In the aforementioned conventional head cylinder fixing apparatus, however, the screws 57 and 58 have to be attached or detached from the rear side of the deck base 51 when attaching or detaching the head cylinder 56, and an operation of inverting the posture of the deck base 51 becomes necessary, so there is a problem that the entire attaching or detaching operation is inefficient.

Also, since the head cylinder 56 is installed on the deck base 51 through the bed seat 52, the accuracy of the height of a magnetic head 59 on the head cylinder 56 or the accuracy of the tilt angle of the center axis 61 of the rotational cylinder of the head cylinder 56 depends upon the dimensional errors of three members consisting of the deck base 51, the bed seat 52, and the head cylinder 56, so there is another problem that cumulative errors degrade the positional accuracy of the head cylinder 56.

SUMMARY OF THE INVENTION

Accordingly, an object of the present invention is to provide an apparatus for fixing a head cylinder, which is capable of easily attaching or detaching a head cylinder and enhancing the positional accuracy of the head cylinder.

According to the present invention, an apparatus for fixing a head cylinder provided with a magnetic head to a deck base, has: a flange portion provided on a lower portion of the head cylinder; contacting portions provided on the lower portion of the head cylinder; and an elastic plate and screws for fixing the head cylinder to the deck base by applying a force directed to the deck base to the flange portion with the elastic plate and screws contacted with the deck base.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Preferred embodiments of an apparatus for fixing a head cylinder of the present invention will hereinafter be described with reference to the accompanying drawings.

First Embodiment

Figure 1:
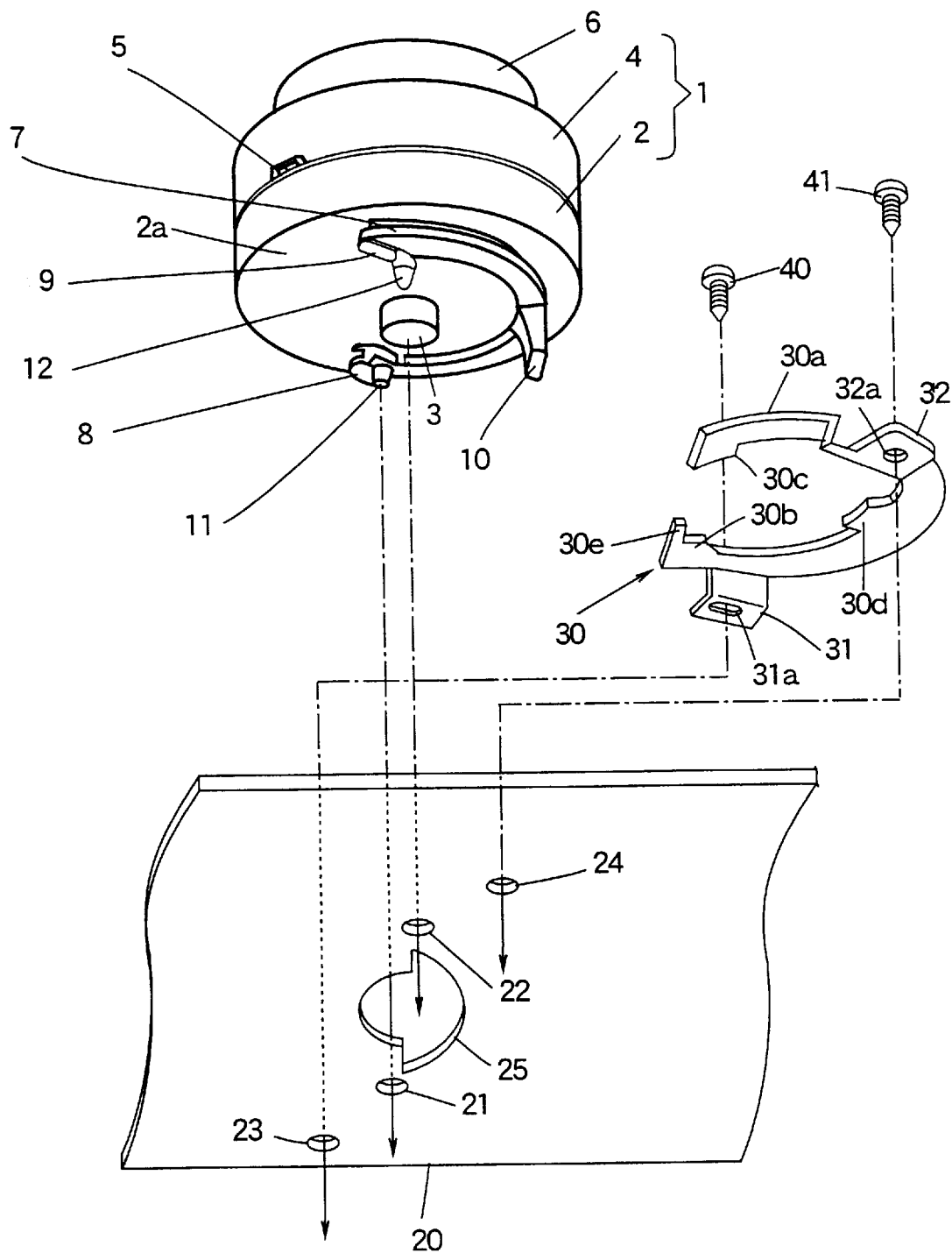
FIG. 1 is an exploded perspective view showing the configuration of each part of an apparatus for fixing a head cylinder in accordance with a first embodiment of the present invention.
Figure 2A:
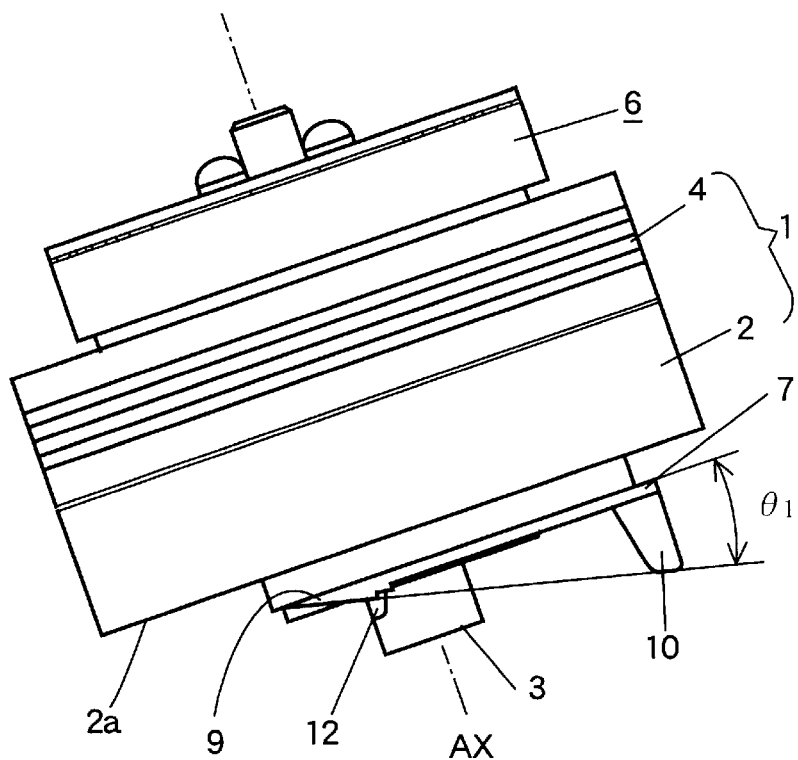
FIGS. 2A and 2B are enlarged front and bottom views showing the head cylinder of FIG. 1.
Figure 2B:
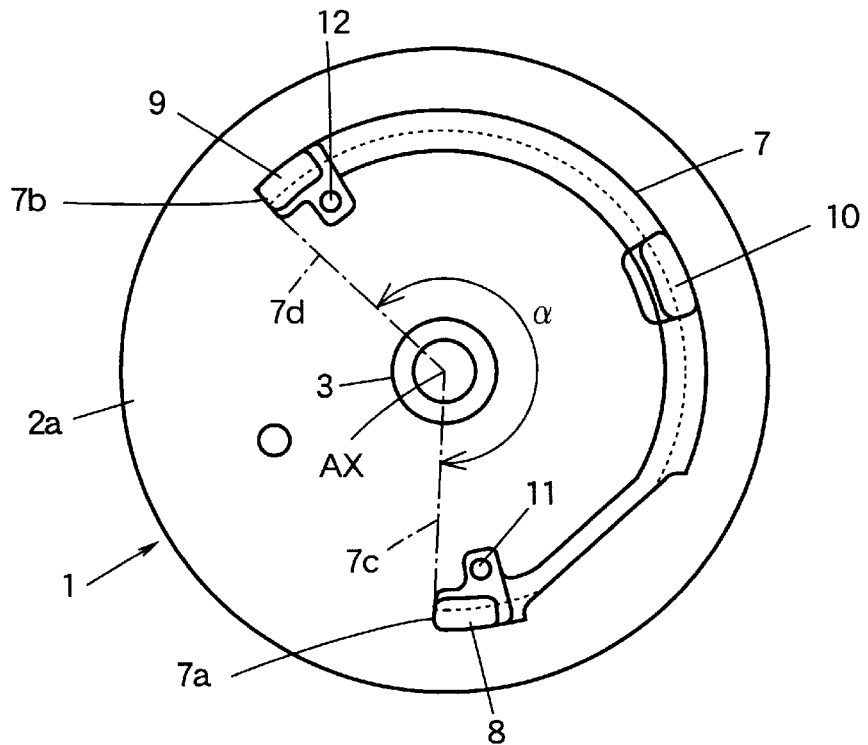

FIG. 1 is an exploded perspective view showing the configuration of each part of an apparatus for fixing a head cylinder in accordance with a first embodiment of the present invention. Also, FIGS. 2A and 2B are enlarged front and bottom views showing the head cylinder of FIG. 1. Furthermore, FIG. 3 through FIG. 7 are diagrams used to explain the fixing manner and the fixing procedure of the head cylinder.

As shown in FIG. 1 and FIGS. 2A and 2B, a head cylinder 1 has a lower drum (L/D) 2 with a lead groove (not shown) which guides magnetic tape (not shown). This lower drum 2 is fixed 50604U onto a deck base 20 by elastic plate 30 and first and second screws 40 and 41. The head cylinder 1 also has an upper drum (U/D) 4 which is provided on the lower drum 2 so that it rotates on a rotational center (S/D) 3. This upper drum (U/D) 4 is equipped with a magnetic head 5 and also is equipped with a motor drum (M/D) 6 which rotates the upper drum 4.

The bottom surface 2a of the lower drum 2 is equipped with a flange portion 7 which the elastic plate 30 engages, first through third contacting portions 8, 9, and 10 which contact the upper surface of the deck base 20, and first and second bosses 11 and 12. These are formed integrally on the lower drum 2 or joined to the bottom surface 2a of the lower drum 2. The first, second, and third contacting portions 8, 9, and 10, by contacting the upper surface of the deck base 20, determines the tilt of the head cylinder 1 to the deck base 20. The first and second bosses 11 and 12 engage the first and second through holes 21 and 22 and determine the position of the head cylinder 1 to the deck base 20. It should be noted that although in FIG. 2 two positioning bosses have been equipped, this number is not limited to two. Also, the first and second through holes 21 and 22 formed in the deck base 20 do not always need to penetrate the deck base, and the holes may be grooves if they are enough deep to engage with the first and second bosses 11 and 12.

As shown in FIG. 2B, the configuration of the flange portion 7 is nearly a circular arc configuration when viewed from a front of the bottom surface 2a of the lower drum 2 (i.e., in a direction toward the bottom surface 2a). The angle α, which is formed by a first line 7c that links the first end portion 7a of the flange portion 7 and the center axis AX of the head cylinder 1 and a second line 7d that links the second end portion 7b of the flange portion 7 and the center axis AX of the head cylinder 1, is set to about 190°. However, the angle α is not limited to 190° but may have other values not less than 180°.

The heights of the first and second contacting portions 8 and 9 from the bottom surface 2a of the lower drum 2 are identical, and the height of the third contacting portion 10 from the bottom surface 2a of the lower drum 2 is higher than those of the first and second contacting portions 8 and 9. The points of the first through the third contacting portions 8, 9, and 10 are formed into flat surfaces so as to contact the surface of the deck base 20. The flat surfaces of the points of the first through the third contacting portions 8, 9, and 10, as shown in FIG. 2A, have an inclination of angle $\theta_1$ relative to a plane including the bottom surface 2a of the lower drum 2 (or a plane including the flange portion 7).

As shown in FIG. 1, the deck base 20 is equipped with first and second screw holes 23 and 24 and a cutout hole 25.

Figure 3:
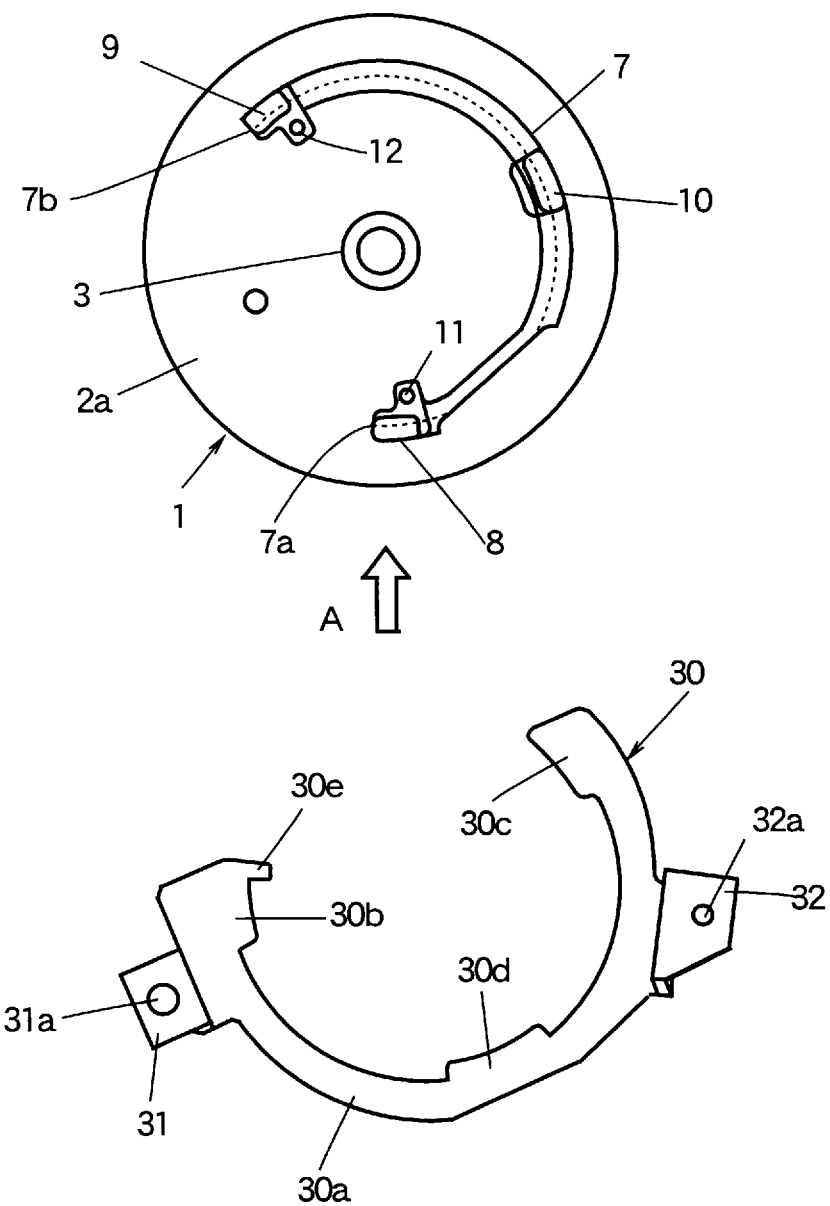
FIG. 3 is an explanatory diagram (No. 1) indicating the procedure of fixing the head cylinder of the first embodiment.

Also, as shown on the lower side of FIG. 3, the configuration of the elastic plate 30, when viewed from the front of the bottom surface, is nearly a circular arc configuration having a center angle nearly equal to (or slightly greater than) the angle α of the flange portion 7. The elastic plate 30 is a metal plate with a thickness of 1.6 [mm]. The elastic plate 30 has a circular arc-shaped base portion 30a and has first through third engaging portions 30b, 30c, and 30d protruding toward the base portion 7a from the base portion 30a so as to engage with the flange portion 7. The elastic plate 30 also has first and second leg portions 31 and 32 where the points, bent from the outer periphery, contact the upper surface of the deck base 20. The flat point surface portions of the leg portions 31 and 32 are respectively equipped with through holes 31a and 32a through which first and second screws 40 and 41 are inserted. Here, as shown in FIG. 3, the reason why the through hole 31a is formed into a large diameter is so that the through hole 31a can be reliably stacked on the screw hole 23 of the deck base 20. Also, as shown on the upper side of FIG. 5, the flat point surface portions of the first and second portion 31 and 32 has an inclination of angle $\theta_2$ relative to a plane including the base portion 30a of the elastic plate 30.

Next, a description will be made of the procedure of fixing the head cylinder 1 to the deck base 20 by employing the elastic plate 30 and the first and second screws 40 and 41.

Figure 4:
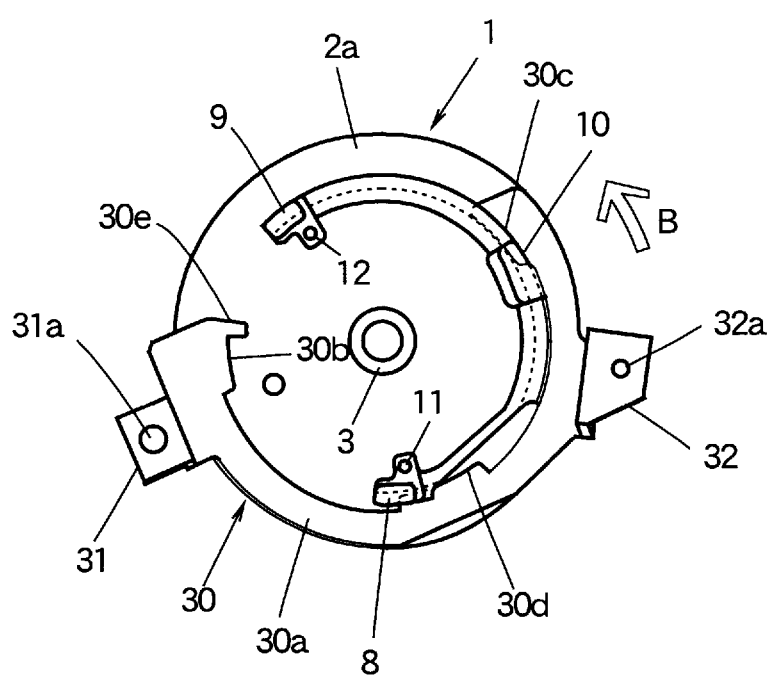
FIG. 4 is an explanatory diagram (No. 2) indicating the procedure of fixing the head cylinder of the first embodiment.
Figure 5:
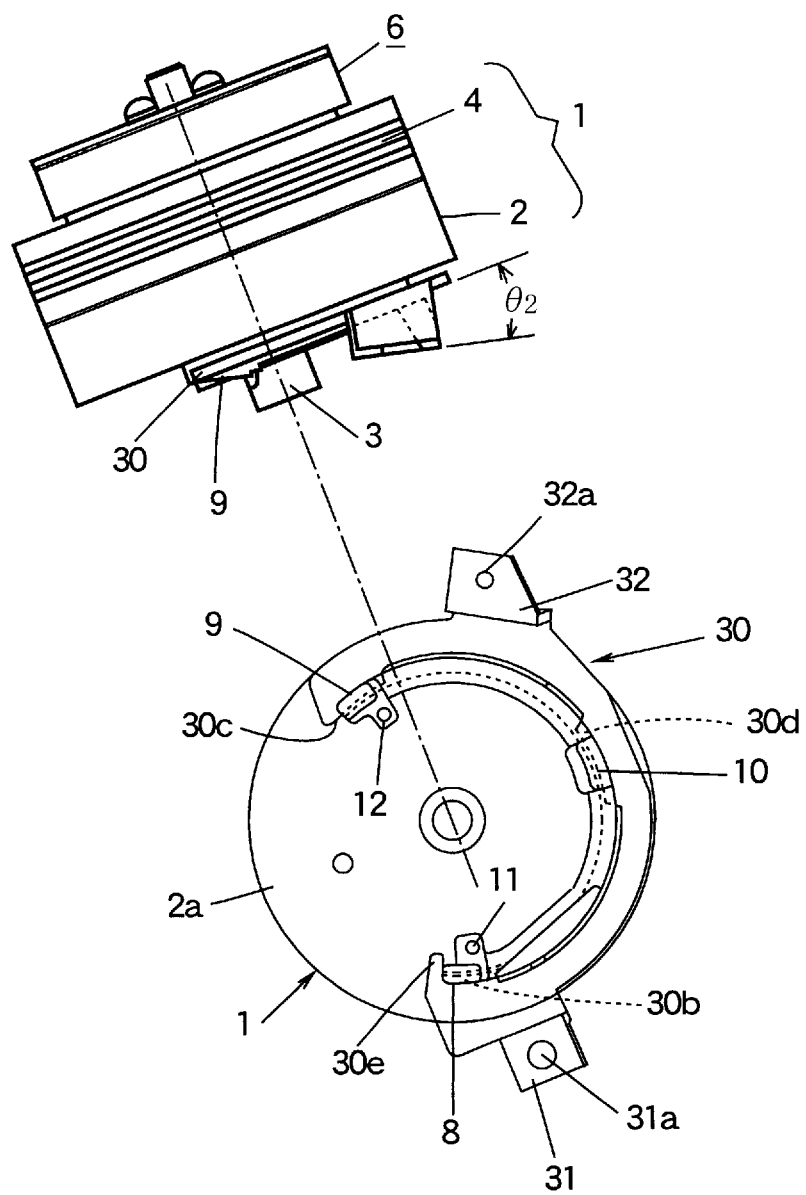
FIG. 5 is an explanatory diagram (No. 3) indicating the procedure of fixing the head cylinder of the first embodiment.

First, as shown in FIG. 3, the elastic plate 30 is inserted on the flange portion 7 in a direction A. Then, as shown in FIG. 4, the elastic plate 30 is rotated in the counterclockwise direction (direction B) until the rotation stop portion 30e of the elastic plate 30 comes into contact with the first end portion 7a of the flange portion 7, and the elastic plate 30 is put in the state shown FIG. 5. At this time, the first through the third engaging portions 30b, 30c, and 30d of the elastic plate 30 engage with the flange portion 7 near the first through the third contacting portions 8, 9, and 10 provided on the bottom surface 2a of the lower drum 2, respectively.

Figure 6:
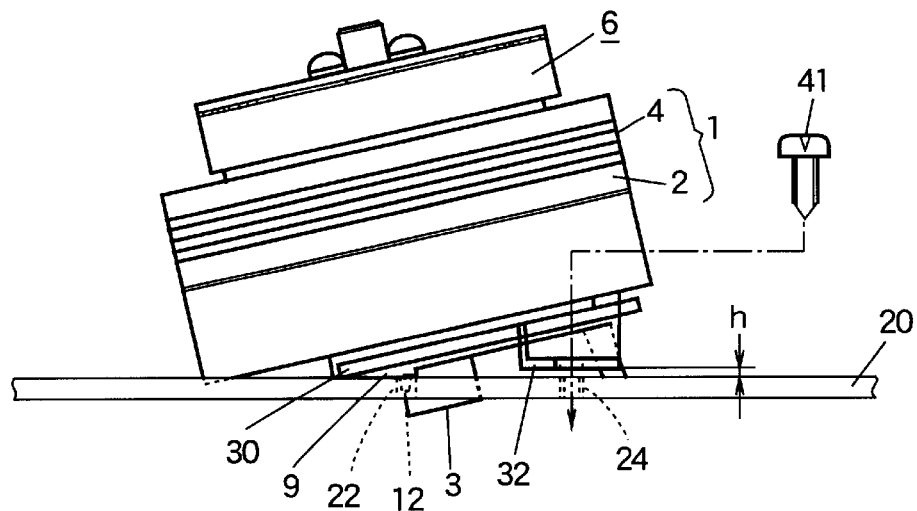
FIG. 6 is an explanatory diagram (No. 4) indicating the procedure of fixing the head cylinder of the first embodiment.

Next, as shown in FIG. 1 and FIG. 6, the head cylinder 1 with the elastic plate 30 is placed on the deck base 20 so that the first boss 11 engages with the first through hole 21 of the deck base 20 and that the second boss 12 engages with the second through hole 22 of the deck base 20. At this time, as shown in FIG. 6, there is gap h between the flat point surface portions of the first and second leg portions 31 and 32 (in FIG. 6, only the second leg portion 32 shown) of the elastic plate 30 and the upper surface of the deck base 20.

Figure 7A:
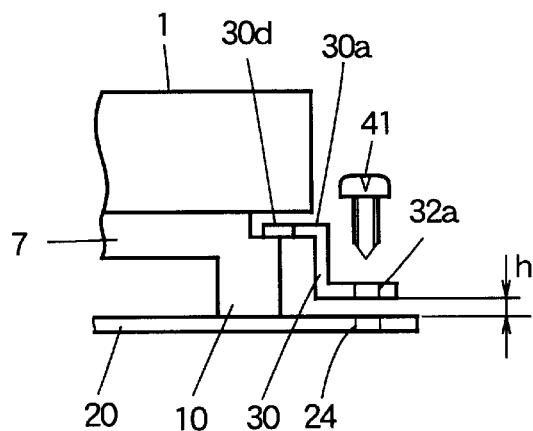
FIGS. 7A and 7B are explanatory diagrams indicating how the head cylinder of the first embodiment is fixed.
Figure 7B:
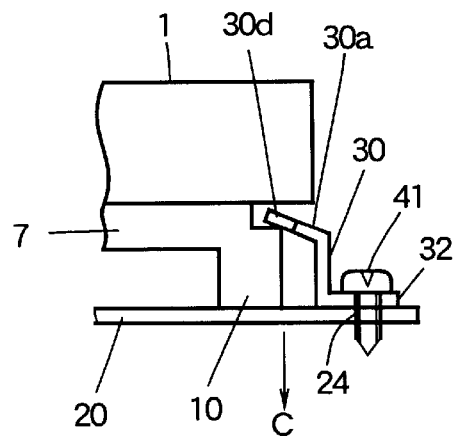

Next, as conceptually shown in FIG. 7A, the screws 40 and 41 (in FIG. 7A only the screw 41 is shown) are passed through the through holes 31a and 32a (in FIG. 7A only the through hole 32a is shown) of the first and second leg portions 31 and 32 (in FIG. 7A, only the second leg portion 32 is shown) of the elastic plate 30 and are inserted into the screw holes 23 and 24 (in FIG. 7A, only the through hole 24 is shown) of the deck base 20. Then, as conceptually shown in FIG. 7B, by tightening the screws 40 and 41 (in FIG. 7B, only the screw 41 is shown), the first and second leg portions 31 and 32 (in FIG. 7B, only the second leg portion 32 is shown) of the elastic plate 30 are brought into contact with the upper surface of the deck base 20, and the gap h is closed. At this time, the first, second, and third engaging portions 30b, 30c, and 30d (in FIG. 7B, only the third engaging portion 30d is shown) and the base portions 30a of the elastic plate 30 are bent by the tightening of the screws 40 and 41. Consequently, the flange portion 7 is given a force C directed to the deck base 20, and the head cylinder 1 is fixed to the deck base 20.

As previously described, according to the first embodiment, the head cylinder is fixed to the deck base 20 by giving the flange portion 7 a force directed to the deck base 20 by employing both the elastic plate 30 and the first and second screws 40 and 41, with the first and second bosses 11 and 12 engaged with the through holes 21 and 22 of the deck base 20 and also with the first through the third contacting portions 8, 9, and 10 contacted with the upper surface of the deck base 20. Accordingly, the attaching and detaching of the head cylinder 1 become easier as compared with the conventional example where a bed seat is first screwed to a deck base and then a head cylinder is screwed to the bed seat. In addition, since there is no need to turn the deck base 20 over in attaching or detaching the head cylinder 1, the quantity of the operation for attaching or detaching the head cylinder 1 can be reduced.

Furthermore, particularly in the case where the head cylinder 1 and the first through third contacting portions 8, 9, and 10 are integrally formed, the positional accuracy of the head cylinder 1 to the deck base 20 can be enhanced because no bed seat which is a separate member is interposed between the head cylinder 1 and the deck base 20 as in the conventional example does.

Second Embodiment

Figure 8:
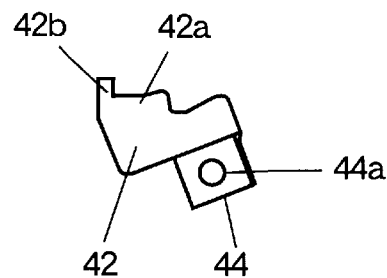
FIG. 8 is a bottom view showing a first elastic plate of an apparatus for fixing a head cylinder in accordance with a second embodiment of the present invention.
Figure 9A:
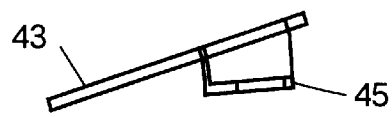
FIG. 9A and 9B are front and bottom views showing a second elastic plate of an apparatus for fixing the head cylinder according to the second embodiment.
Figure 9B:
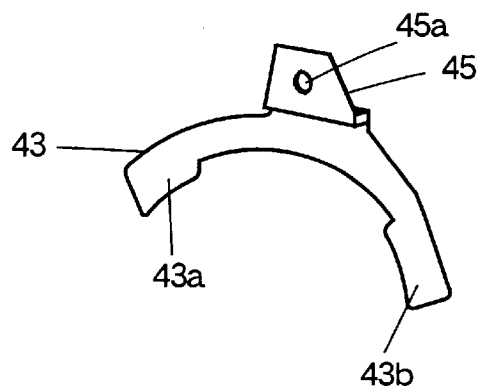
Figure 10:
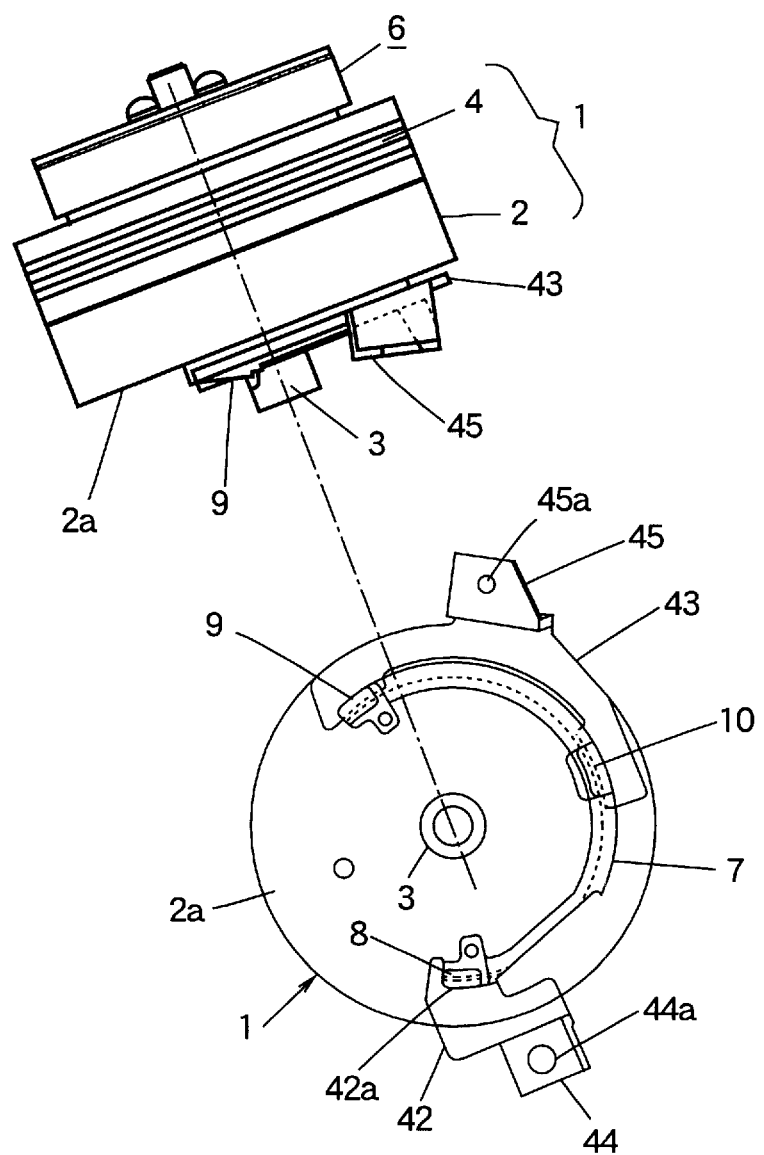
FIG. 10 is an explanatory diagram showing how the first and second elastic plates of the second embodiment engage with the flange portion of the head cylinder.
Figure 11A:
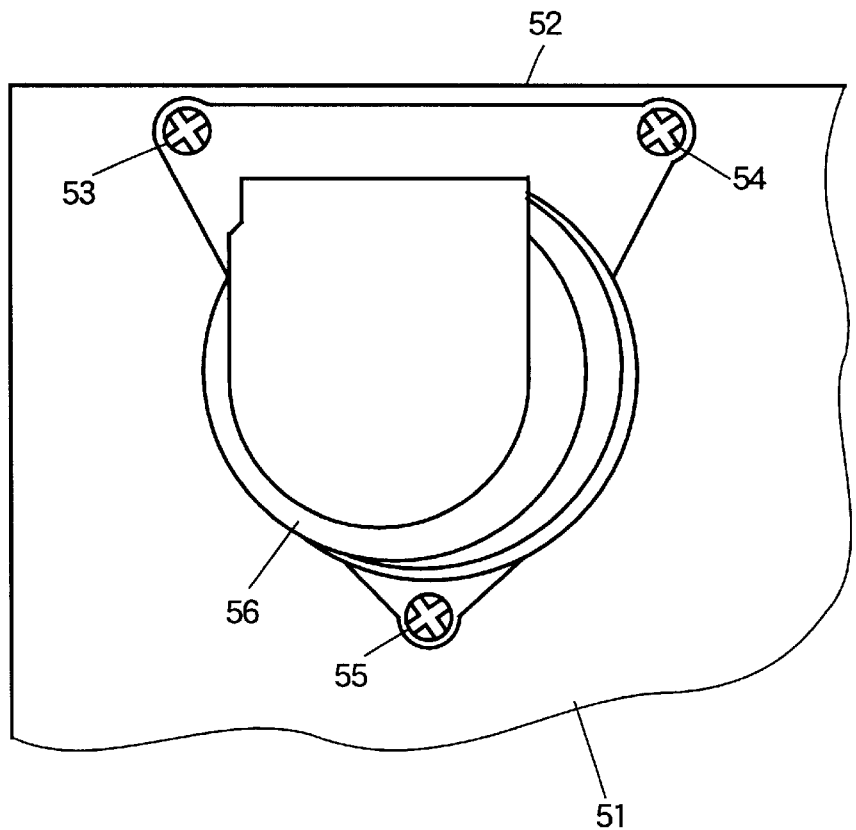
FIGS. 11A and 11B are plan and side views showing a conventional apparatus for fixing a head cylinder utilized in the apparatus utilizing a helical-scan manner.
Figure 11B:
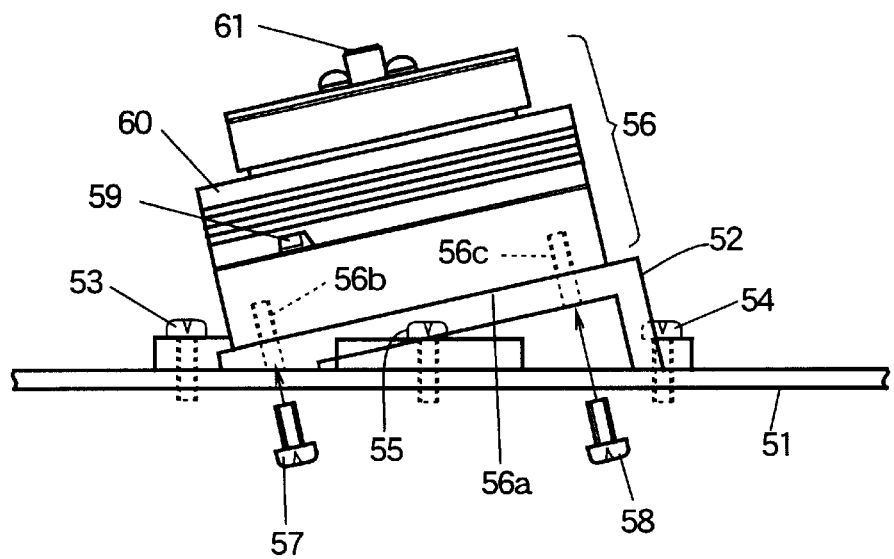

FIG. 8 is a bottom view showing a first elastic plate 42 of an apparatus for fixing a head cylinder in accordance with a second embodiment of the present invention, and FIGS. 9A and 9B are front and bottom views showing a second elastic plate 43 of the head cylinder fixing apparatus in accordance with the second embodiment. FIG. 10 is a diagram used to explain how the first and second elastic plates 42 and 43 engage with a flange portion 7.

The head cylinder fixing apparatus according to the second embodiment differs from that according to the first embodiment (shown in FIGS. 1 through 7) only in the configurations of the first and second elastic plates 42 and 43. Therefore, in FIG. 10, parts except for the first and second elastic plates 42 and 43 are the same as those shown in FIG. 1 through FIGS. 7A and 7B, and the same reference numerals will be assigned.

As shown in FIG. 8 and FIG. 10, the first elastic plate 42 engages with the flange portion 7 on the side of the first contacting portion 8. The first elastic plate 42 has a first engaging portion 42a which engages with the flange portion 7, a rotation stop portion 42b, a leg portion 44 with the same shape as the first leg portion 31 in FIG. 1 (first embodiment), and a through hole 44a formed in the leg portion 44.

As shown in FIGS. 9A and 9B and FIG. 10, the second elastic plate 43 engages with the flange portion 7 on the side of the second contacting portion 9. The second elastic plate 43 has a second engaging portion 43a which engages with the flange portion 7, a third engaging portion 43b which engages with the flange portion 7, a leg portion 45 with the same shape as the second leg portion 32 in FIG. 1 (first embodiment), and a through hole 45a formed in the leg portion 45.

According to the head cylinder fixing apparatus of the second embodiment, the elastic plate is divided into two parts, so the first and second elastic plates 42 and 43 can engage with the flange portion 7 after the head cylinder 1 is placed on the deck base 20.

In the head cylinder fixing apparatus of the second embodiment, points other than the aforementioned description are the same as in the case of the aforementioned first Embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A recording/reproducing apparatus comprising:

a deck base having a mounting surface;

a head cylinder having a flange portion on the bottom surface thereof; and an elastic plate having a first portion which, when secured to said deck base, causes a second portion of said elastic plate to exert a force on the flange portion of said head cylinder in the direction of said deck base so as to secure said head cylinder to the mounting surface of said deck base, wherein the bottom surface of said head cylinder is provided with protruding portions;

said deck base is provided with recess portions; and said protruding portions engage with said recess portions.

2. The apparatus according to claim 1, wherein;

said protruding portions provided on said head cylinder are constituted as first and second bosses;

said recess portions provided in said deck base are constituted by first and second through holes; and said first boss engages with said first through hole and said second boss engages with said second through hole.

3. A recording/reproducing apparatus comprising:

a deck base having a mounting surface;

a head cylinder having a flange portion on the bottom surface thereof, said flange portion having an upper surface which faces a bottom surface of said head cylinder and a lower surface which faces said deck base; and an elastic plate which engages with said upper surface of said flange portion of said head cylinder, said elastic plate having a first portion which is secured to said deck base to cause a second portion of said elastic plate to exert a downward force on said upper surface of said flange portion of said head cylinder in the direction of said deck base so as to secure said head cylinder to the mounting surface of said deck base.

4. The apparatus according to claim 3, wherein;

said head cylinder has a stationary drum which is fixed to said deck base by said elastic plate and a rotational drum which is provided on said stationary drum; and said flange portion is provided integrally on a bottom surface of said stationary drum.

5. The recording/reproducing apparatus according to claim 3, further comprising:

contacting means provided on the bottom of said head cylinder which contacts the mounting surface of said deck base.

6. The apparatus according to claim 5, wherein;

said contacting means has first, second and third contacting portions which contact said deck base; and the third contacting portion of said contacting means protrudes farther from the bottom surface of said stationary drum than the first and second contacting portions so that the bottom surface of said stationary drum is not parallel with the mounting surface of said deck base.

7. The apparatus according to claim 5, wherein said elastic plate is fixed to the mounting surface of said deck base with a screw so that a force is applied to said flange portion in the direction of said deck base.

8. The apparatus according to claim 7, wherein;

said flange portion has first and second end portions and is formed in the shape of a circular arc;

an angle, which is formed by a first line linking said first end portion with a center axis of said head cylinder and a second line linking said second end portion with said center axis, is greater than 180°; and the force directed toward said deck base is applied to at least a portion of said flange portion near said first end portion, a portion of said flange portion near said second end portion, and a portion between said first end portion and said second end portion.

9. The apparatus according to claim 8, wherein said elastic plate has a rotation stop portion which determines the position of said elastic plate relative to said flange portion by contacting either said first end portion or said second end portion of said flange portion.

10. The apparatus according to claim 7, wherein;

said contacting means has first, second, and third contacting portions which contact said deck base;

the third contacting portion of said contacting means protrudes farther from the bottom surface of said stationary drum than the first and second contacting portions; and said elastic plate has first, second, and third engaging portions which engage with said flange portion near the first, second, and third contacting portions of said contacting means.

11. The apparatus according to claim 7, wherein said elastic plate has a first elastic plate which engages with said flange portion on a side of said first end portion and a second elastic plate which engages with said flange portion on a side of said second end portion.

* * * * *